Oct. 15, 1957 J. P. THEISEN 2,809,579
ROTISSERIE
Filed June 7, 1954 3 Sheets-Sheet 1
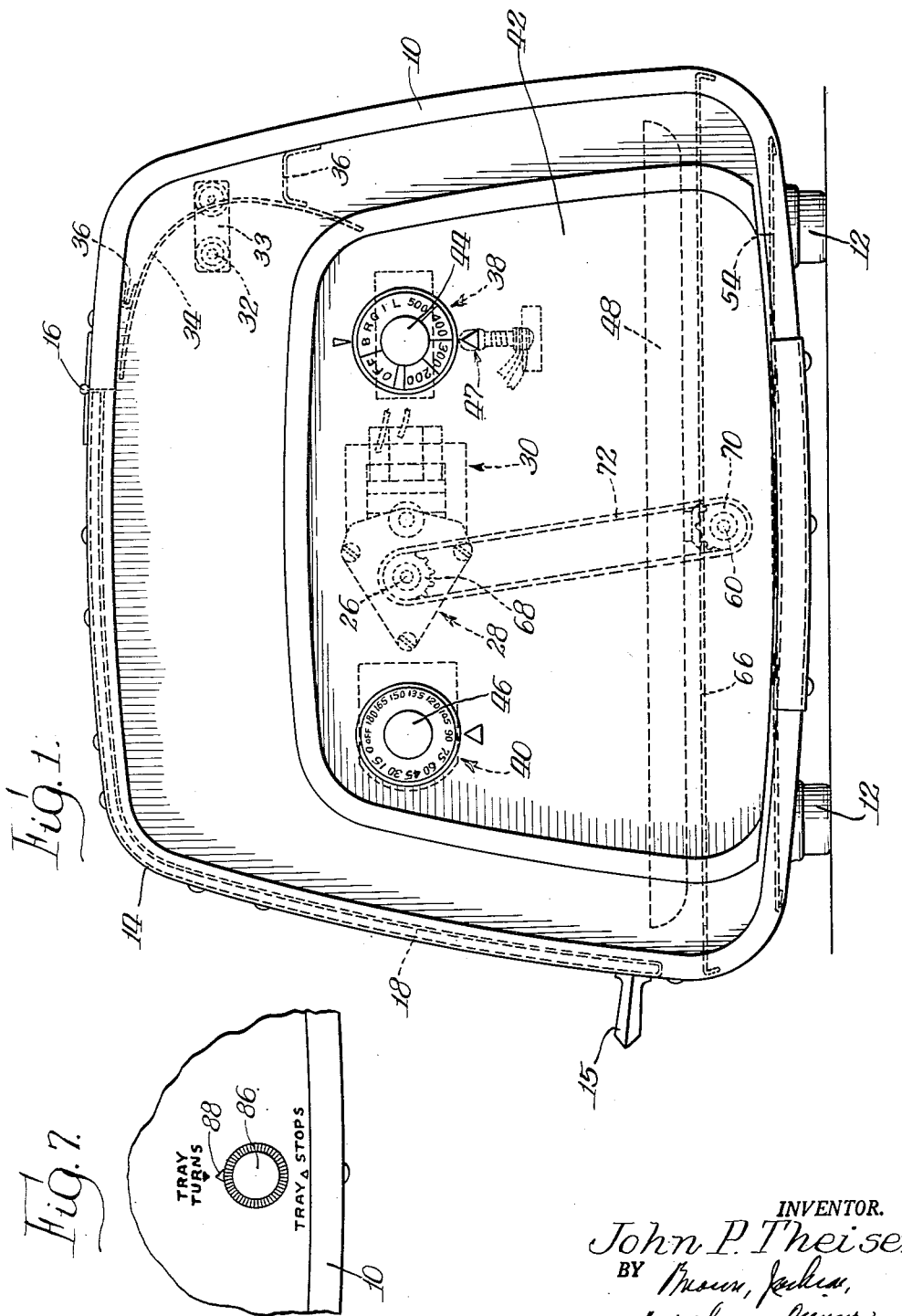
INVENTOR.
John P. Theisen,
BY
ATTY'S.

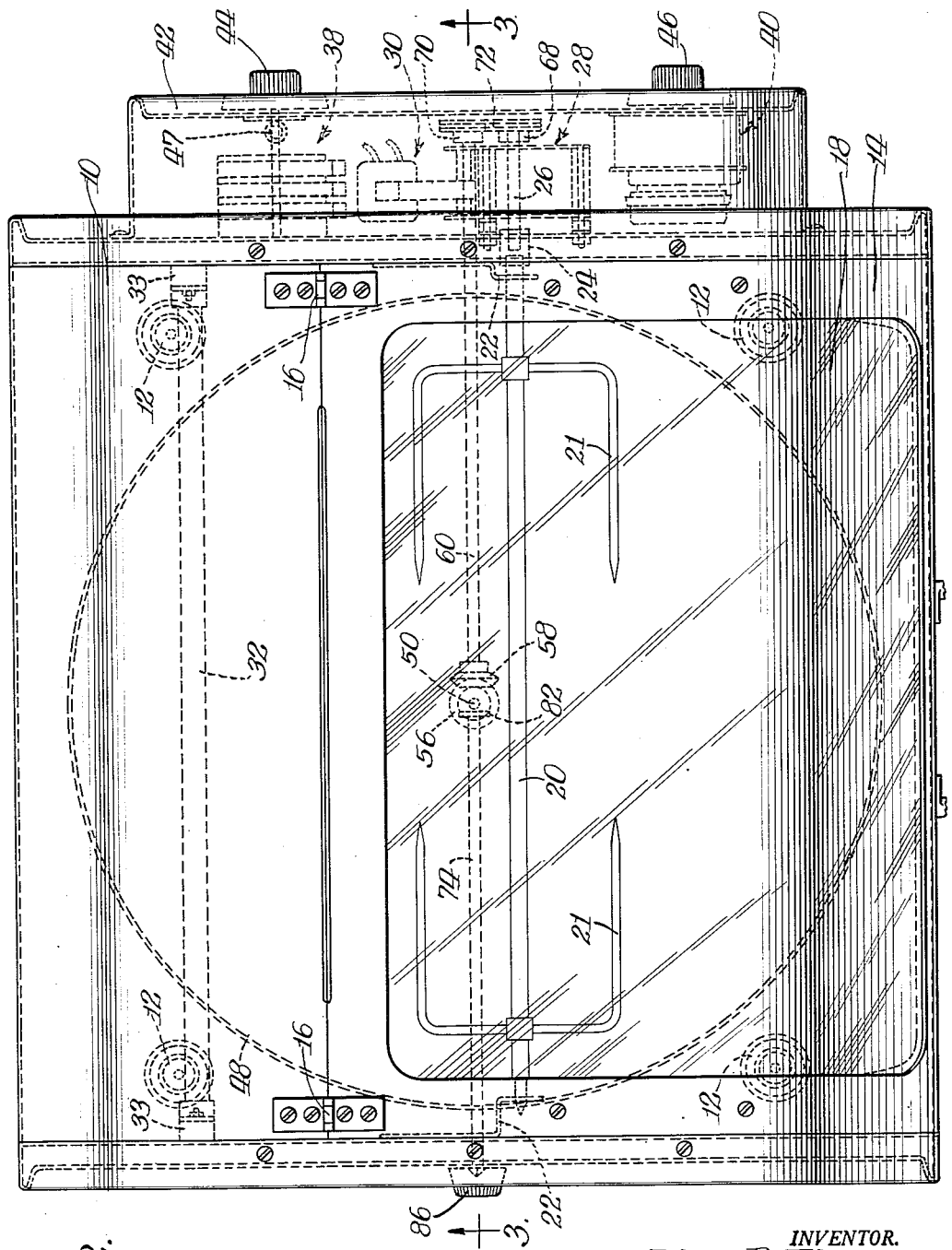

Oct. 15, 1957 J. P. THEISEN 2,809,579
ROTISSERIE
Filed June 7, 1954 3 Sheets-Sheet 3
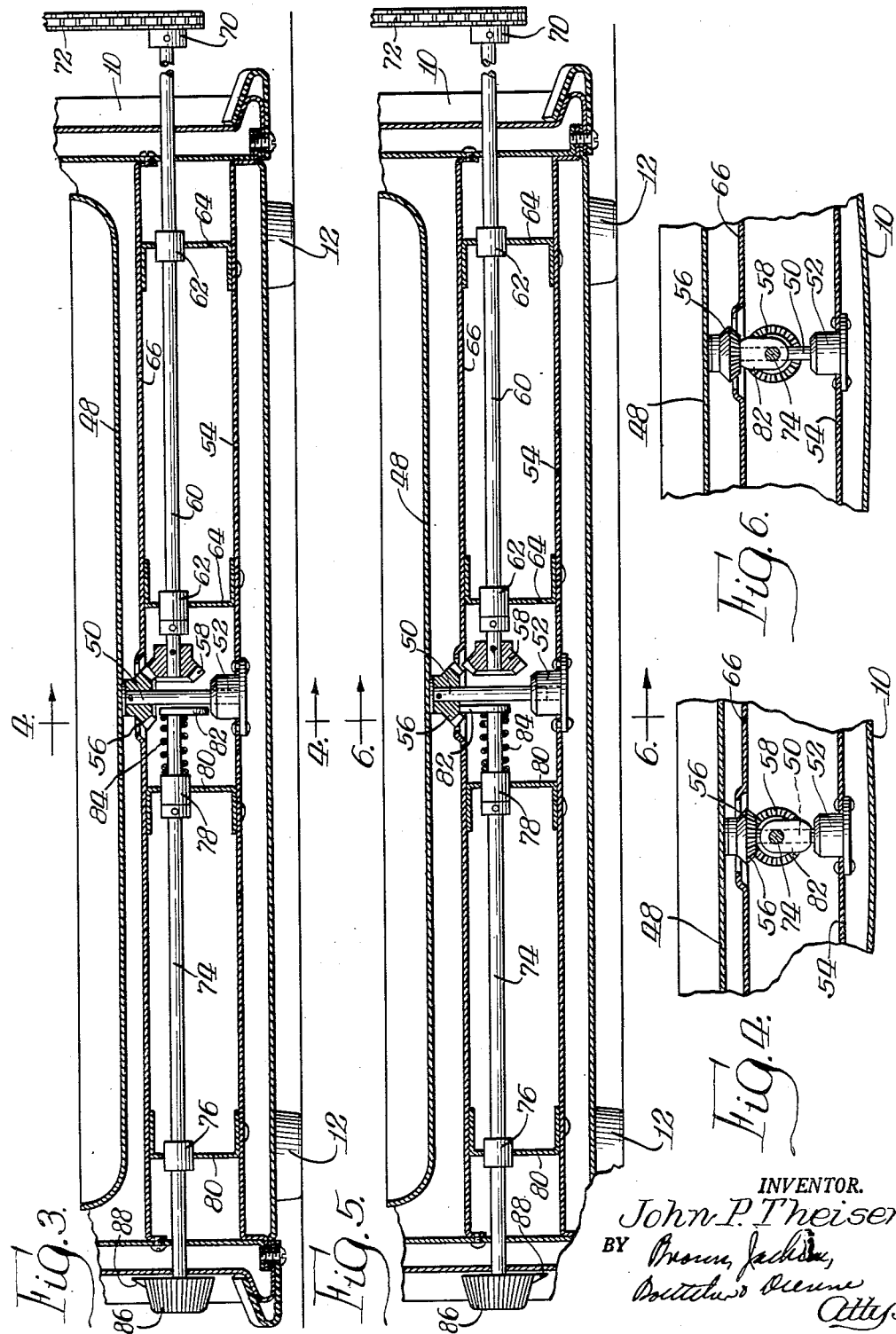
INVENTOR.
John P. Theisen,
BY
ATTYS.

United States Patent Office 2,809,579
Patented Oct. 15, 1957

2,809,579

ROTISSERIE

John P. Theisen, Jacksonville, Ill., assignor, by mesne assignments, to Knapp-Monarch Company, St. Louis, Mo., a corporation of Delaware Application June 7, 1954, Serial No. 434,887

2 Claims. (Cl. 99—339)

My present invention relates to an electric cooker or rotisserie for barbecuing meats, fowl, fish, sausages, and like food articles.

It is an object of my present invention to provide a rotisserie which may be employed for barbecuing simultaneously a large meat article such as a fowl and a plurality of small meat articles such as patties or sausages.

In accomplishing the afore-noted object I provide a rotisserie which has a spit assembly rotatable only about a horizontal axis and food supporting tray means rotatable only about a vertical axis. Primary drive means including prime mover means is provided for effecting rotation of the spit assembly, while secondary drive means having connection with the primary drive means and the food supporting tray means is provided for selectively effecting rotation of the latter simultaneously with the spit assembly.

It is another object of my present invention to provide manually operable means whereby the driving connection between the secondary drive means and the food supporting tray means may be selectively interrupted.

To accomplish the above object, the food supporting tray means is secured to the upper end of a stub shaft rotatably supported in the rotisserie housing. First bevel gear means is non-rotatably mounted on the stub shaft, and meshing with the first bevel gear means is the second bevel gear means of the secondary drive means. Manually rotatable cam means is associated with the first bevel gear means and is adapted to raise selectively the latter, whereby the driving connection between the first and second bevel gear means may be interrupted.

It is a feature of my present invention that the food supporting tray means, stub shaft and first bevel gear means may be removed as a unit from the rotisserie so that these elements and the inside of the rotisserie may be conveniently cleaned.

Now in order to acquaint those skilled in the art with the manner of constructing and using rotisseries in accordance with the principles of my present invention, I shall describe in connection with the accompanying drawings, a preferred embodiment of my invention.

In the drawings:

Figure 1 is a side elevational view of the rotisserie of my present invention;

Figure 2 is a plan view of the rotisserie of Figure 1;

Figure 3 is a partial vertical sectional view taken substantially along the line 3—3 in Figure 2, and shows the food supporting tray means in operative position for rotation;

Figure 4 is a partial vertical sectional view taken substantially along the line 4—4 in Figure 3;

Figure 5 is a partial vertical sectional view taken substantially along the line 3—3 in Figure 2, and shows the food supporting tray means in inoperative position for rotation;

Figure 6 is a partial vertical sectional view taken substantially along the line 6—6 in Figure 5; and Figure 7 is a partial side elevational view of the rotisserie and shows the control knob for the manual operable means which serves to move the food supporting tray means between operative and inoperative positions.

Referring now to the drawings, the rotisserie of my present invention comprises a casing or housing, indicated by the reference numeral 10, which is preferably formed of sheet-metal stampings. The housing 10 is supported at its four corners on conventional resilient foot members or pads 12. The sides of the housing slope gradually inwardly from bottom-to-top, as shown in Figure 1, while the double-wall ends of the housing are arranged vertically, as shown in Figure 2. A large opening is formed in the front-side and top of the housing through which access may be had to the interior of the latter, and a curved cover member 14, having a handle 15, is hinged by connectors 16 to the housing for providing a closure for the housing opening. A suitable panel of heat resistant transparent material 18, such as glass or the like, is arranged in the cover member 14 so that the inside of the rotisserie may be readily viewed.

Extending between the ends of the rotisserie housing 10, substantially centrally thereof, is a rotatable spit assembly which includes a central shaft 20 and sets of axially adjustable holding points 21 adapted to support meat or fish to be barbecued. The ends of the shaft 20 of the food supporting means or spit assembly are journaled for rotation about a horizontal axis in the offset end portions of bearing brackets 22 secured to the inside walls of the ends of the rotisserie housing. The right-hand end of the spit 20, as viewed in Figure 2, has driving connection, through a coupling collar 24, with the driven shaft 26 of a gear reducing mechanism indicated generally at 28. The gear reducing mechanism 28, which is supported on the outward wall of the adjacent end of the rotisserie housing, is driven by a prime mover or conventional electric motor indicated generally at 30. When the electric motor 30 is electrically energized, the spit assembly 20 is rotated slowly by means of the afore-described primary drive means.

Within the housing 10, I arrange an electric heating element 32 in spaced relation from, and parallel to, the spit assembly 20. The ends of the element 32 are mounted to the housing 10 by means of insulating blocks 33. For reflecting the heat from the heating element 32 toward the spit assembly 20, a curved metallic reflector 34, suspended from the housing 10 by brackets 36, is provided behind the heating element 32.

A thermostat, indicated generally at 38, is mounted at the right-hand side of the motor 30, as viewed in Figure 1, and has suitable connection in the electrical circuit of the heating element 32, for controlling the amount of current flowing to the heating element 32 and hence the heat given off by the latter. A timer mechanism, indicated generally at 40, is arranged at the left-hand side of the motor, as viewed in Figure 1, and has suitable connection in the electrical circuits of both the motor 30 and heater 32 whereby the length of time that the latter are energized may be automatically controlled.

The gear mechanism 28, motor 30, thermostat 38, and timer mechanism 40 are enclosed within a side cover member 42 which is detachably mounted to the side of the rotisserie housing. The control shafts of the thermostat 38 and timer mechanism 40 project through the cover member 42 and respectively have combined control knobs and indicia bearing dials 44 and 46 mounted thereon. A conventional indicating bulb assembly 47 is arranged adjacent the dial of the thermostat 38.

Arranged beneath the spit assembly 20 is food supporting means 48 which is rotatable about a vertical axis. The food supporting means 48 is in the form of a circular horizontal rotatable tray or pan preferably of sheet metal from which extends vertically downwardly, as shown in Figure 3, a stub shaft 50. The stub shaft 50 is normally supported at its lower end in a vertical thrust bearing 52 secured, as by rivets, to the horizontal panel 54 of the rotisserie housing 10. The pan 48 is rotated by secondary drive means to be described, which is, in turn, driven by the primary drive means described above. The construction and operation of the secondary drive means is as follows: Rigidly connected to the shaft 50 immediately beneath the pan 48, is a bevel gear 56 which meshes with a bevel gear 58 rigidly connected to the one end of a horizontal secondary drive shaft 60 lying below the tray 48. The shaft 60 is journaled in bushing members 62 carried in vertically extending web members 64 fixed at their lower ends to the housing panel 54, and at their upper ends to the horizontal panel 66 of the housing 10. The panel 66 has a central opening, with a flared mouth, formed therein through which the bevel gear 56 extends. The flared mouth of the central opening serves to shield the secondary drive means from dirt, grease and food particles that may accumulate on the housing panel 66. The pan 48, shaft 50 and bevel gear 56 may be removed as a unit from the rotisserie so that these elements and the inside of the housing 10, including the panel 66, may be conveniently cleaned.

The shaft 60 extends outwardly of the housing 10 into the area enclosed by the side cover member 42. Within the latter area, sprocket wheels 68 and 70 are respectively secured to the driven shaft 26 of the gear reducing mechanism 28 and the secondary drive shaft 60. A chain 72 is trained over the sprocket wheels 68 and 70 for establishing a driving connection therebetween. By means of the afore-described secondary drive means, the pan 48 may be selectively rotated conjointly with the spit assembly 20.

Although, as explained, the pan 48 may be rotated conjointly with the spit assembly 20, such conjoint rotation is not always necessary or desirable. Consequently, I provide selectively manually operable means for separating the bevel gears 56 and 58 whereby the driving connection between the secondary drive means and the food supporting tray means may be interrupted.

The disestablishing means comprises a horizontal shaft 74 which is aligned with the secondary drive shaft 60 below the tray 48 and is journaled in bushing members 76 and 78. The bushings 76 and 78 are carried in vertically extending web members 80 fixed at their lower ends to the housing panel 54, and at their upper ends to the housing panel 66. A cam 82 is secured to the inner end of the shaft 74, immediately beneath the bevel gear 56. A coil spring 84 is arranged concentrically about the shaft 74 between the cam 82 and the adjacent bushing member 78 for maintaining the cam 82 in proper operating position relative to the bevel gear 56.

The end of the shaft 74, opposite the cam 82, projects outwardly of the housing 10 and has mounted thereon a control knob 86 having a pointer portion 88. Manual rotation of the control knob 86 causes rotation of the shaft 74 and the cam 82 from the position shown in Figures 3 and 4 to the position shown in Figures 5 and 6. The lobe of the cam, as the latter is rotated, engages the lower portion of the bevel gear 56 and serves to elevate the latter, together with the tray 48 and stub shaft 50, to a position out of engagement with the bevel gear 58. As shown in Figure 7, suitable indicia are provided on the outer surface of the housing 10, which, in conjunction with the pointer 88 of the control knob 86, serve to identify the position which the pan 48 is in.

When barbecuing meat on the spit assembly, the central shaft 20 is stuck through the meat and the holding points 21 are forced into the meat to hold it in place. Then the spit assembly and meat are placed in the rotisserie with the ends of the central shaft 20 inserted in the openings in the offset end portions of the bearing brackets 22. When the tray 48 is not to be used, the knob 86 is suitably rotated for disestablishing the driving connection between the secondary drive means and the tray 48. Then the thermostat 38 and timer mechanism 40 are set at the appropriate positions for energizing the heater 32 and motor 30 and the heat is slowly rotated at the predetermined temperature for the preselected time interval. Upon completion of the barbecuing cycle, the meat is removed from the rotisserie and the spit assembly.

Although the tray 48 serves to collect juices which drip from the meat being barbecued on the split assembly, it is primarily provided for barbecuing meat patties or sausages, either alone or while meat is being barbecued on the spit assembly. In either case, the meat patties and/or sausages are placed in the rotisserie on the tray 48. Then the knob 86 is suitably rotated for permitting the bevel gears 56 and 58 to mesh whereby a driving connection is established between the secondary drive means and the tray 48. The barbecue cycle is then started and timed, and the tray 48 is slowly rotated as the food thereon is cooked. After cooking has been completed, the cooked food may be removed from the tray and the latter, in turn, may be removed from the rotisserie, as has been explained hereinbefore, for cleaning.

Now while I have shown and described what I believe to be a preferred embodiment of my present invention, it will be understood that various modifications and rearrangements may be made therein without departing from the spirit and scope of my invention.

I claim:

1. A cooking device comprising, in combination, drive means continually driving upper and lower horizontal drive shafts, a first food supporting means operatively associated with said upper drive shaft and rotatable about a horizontal axis, a second food supporting means located below said first food supporting means and above said lower drive shaft and adapted to be rotated about a vertical axis, said second food supporting means carrying a bevel gear and a downwardly extending axial elongated stem, bearing means for slidably receiving said stem to permit of vertical movement of said second food supporting means toward and away from said bearing means and in a range in which a portion of said stem is at all times aligned with said bearing means, the lower drive shaft carrying a bevel gear which drivingly meshes with the bevel gear on the second food supporting means when said second food supporting means are in operative position, thereby effecting rotation of said second food supporting means, and selectively operable means arranged to move said second food supporting means and bevel gear carried thereby vertically between said operative position and an inoperative position wherein said bevel gears are separated.

2. A cooking device as set forth in claim 1 wherein said selectively operable means includes a cam member rotatable about a horizontal axis and positioned adjacent the axis of rotation of said second food supporting means.

References Cited in the file of this patent

UNITED STATES PATENTS

| | | |
|---|---|---|
| 381,470 | Harmon | Apr. 17, 1888 |
| 1,163,807 | Bower | Dec. 14, 1915 |
| 1,731,742 | Harrison | Oct. 15, 1929 |
| 1,731,743 | Harrison | Oct. 15, 1929 |
| 2,049,481 | Walterspiel | Aug. 4, 1936 |
| 2,057,421 | Dickson | Oct. 13, 1936 |
| 2,085,169 | Prood | June 29, 1937 |
| 2,151,790 | Mitchell | Mar. 28, 1939 |
| 2,495,865 | Perkins | Jan. 31, 1950 |
| 2,566,524 | Kammins | Sept. 4, 1951 |

FOREIGN PATENTS

| | | |
|---|---|---|
| 12,690 | Great Britain | 1897 |